United States Patent [19]

Liu

[11] Patent Number: 5,743,452
[45] Date of Patent: Apr. 28, 1998

[54] STORAGE CASE MOUNTING STRUCTURE FOR BABY CARTS

[76] Inventor: Yu-Mean Liu, 2F., No. 34, Lane 200, Tung Hwa Street, Taipei, Taiwan

[21] Appl. No.: 831,969

[22] Filed: Apr. 2, 1997

[51] Int. Cl.⁶ .................................................. B60R 7/00
[52] U.S. Cl. ..................... 224/275; 224/419; 224/427; 224/433; 224/435
[58] Field of Search ............................. 224/275, 419, 224/427, 429, 430, 431, 433, 435, 42.13; D12/47, 115; 446/29, 69, 440; 280/288.4; 220/475–477, 481, 790

[56] References Cited

U.S. PATENT DOCUMENTS

| | | | |
|---|---|---|---|
| 5,203,479 | 4/1993 | Lucas | 224/42.13 |
| 5,405,068 | 4/1995 | Lovett | 224/275 |

Primary Examiner—Henry J. Recla
Assistant Examiner—Timothy L. Maust
Attorney, Agent, or Firm—Varndell Legal Group

[57] ABSTRACT

A storage case mounting structure including an upright back frame raised from a rear side of a seat of a baby cart, and a storage case fixedly fastened to the upright back frame to serve as a seat back, the storage case including a case body adapted for holding things and having a retaining hole on the inside, a cover hinged to the case body and having a springy retainer rod adapted to be forced into engagement with the retaining hole of the case body to secure the cover in the closed position, and a hollow, bottom-open coupling block integrally formed at the front side of the case body and sleeved onto the upright back frame of the baby cart and fixedly secured thereto by fastening means, the coupling block having a smoothly curved front side adapted to support the back of the child who rides the baby cart.

1 Claim, 5 Drawing Sheets

STORAGE CASE MOUNTING STRUCTURE FOR BABY CARTS

BACKGROUND AND SUMMARY OF THE INVENTION

The present invention relates to a storage case mounting structure for baby carts, and more particularly to such a storage case that is adapted to be fastened to an upright back frame at a rear side of a seat of a baby cart to serve as a seat back for supporting the back of the child who rides the baby cart.

A baby cart for example a baby tricycle, as shown in FIG. 1, generally comprises a storage case for holding toys, children's personal items, etc., an upright back frame and a back plate on the upright back frame for supporting the back of the child who rides the baby tricycle. The storage case is mounted on a bracket which is welded to the tricycle frame of the baby tricycle. Because the back plate and the storage case are two separate members, they must be separately made and then respectively fastened to the tricycle frame of the baby tricycle.

It is one object of the present invention to provide a storage case for a baby cart which decorates the baby cart. It is another object of the present invention to provide a storage case for a baby cart which is simultaneously served as a seat back for supporting the back of the child who rides the baby cart. It is still another object of the present invention to provide a storage case for a baby cart which is injection-molded from plastic so that its manufacturing cost is low. According to the present invention, the storage case comprises a case body adapted for holding things and having a retaining hole on the inside, a cover hinged to the case body and having a springy retainer rod adapted to be forced into engagement with the retaining hole of the case body to secure the cover in the closed position, and a hollow, bottom-open coupling block integrally formed at the front side of the case body and sleeved onto the upright back frame of the baby cart and fixedly secured thereto by fastening means, the coupling block having a smoothly curved front side adapted to support the back of the child who rides the baby cart.

DETAILED DESCRIPTION OF THE PREFERRED EMBODIMENT

Figure 1:
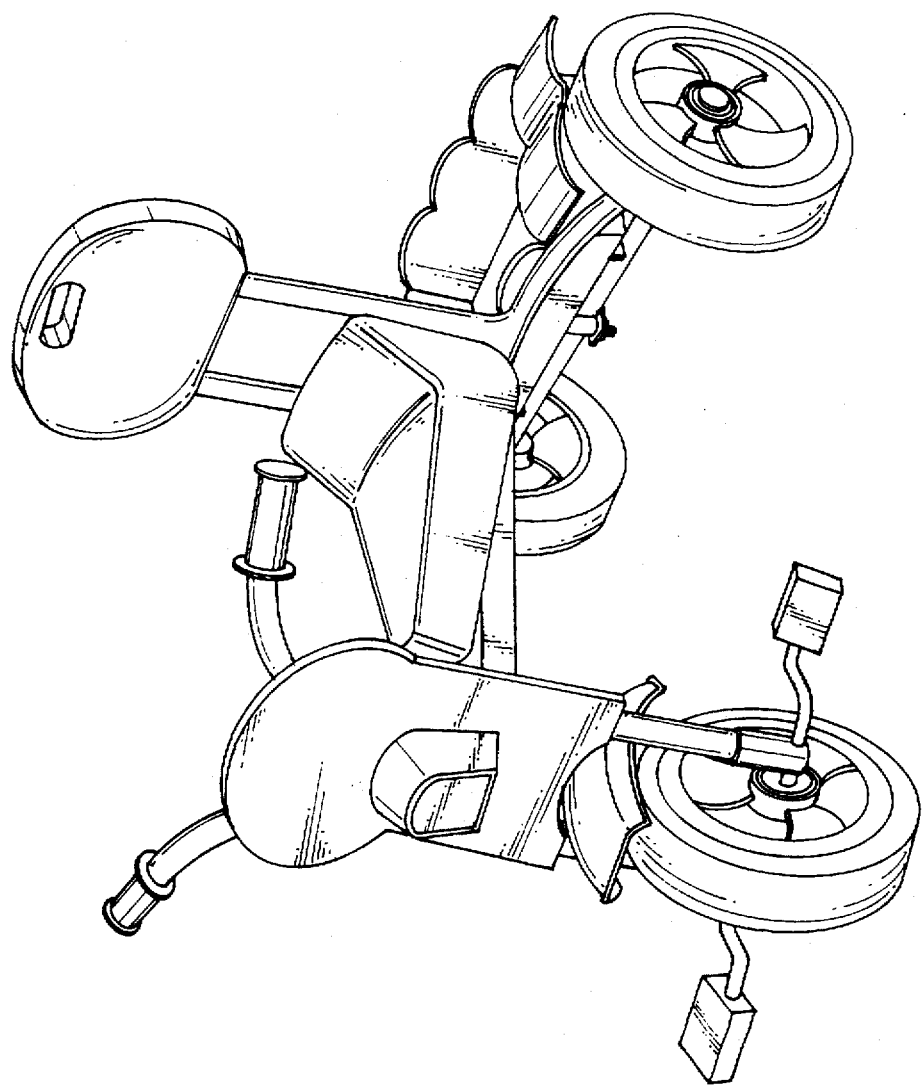
FIG. 1 is an elevational view of a conventional baby tricycle.
Figure 2:
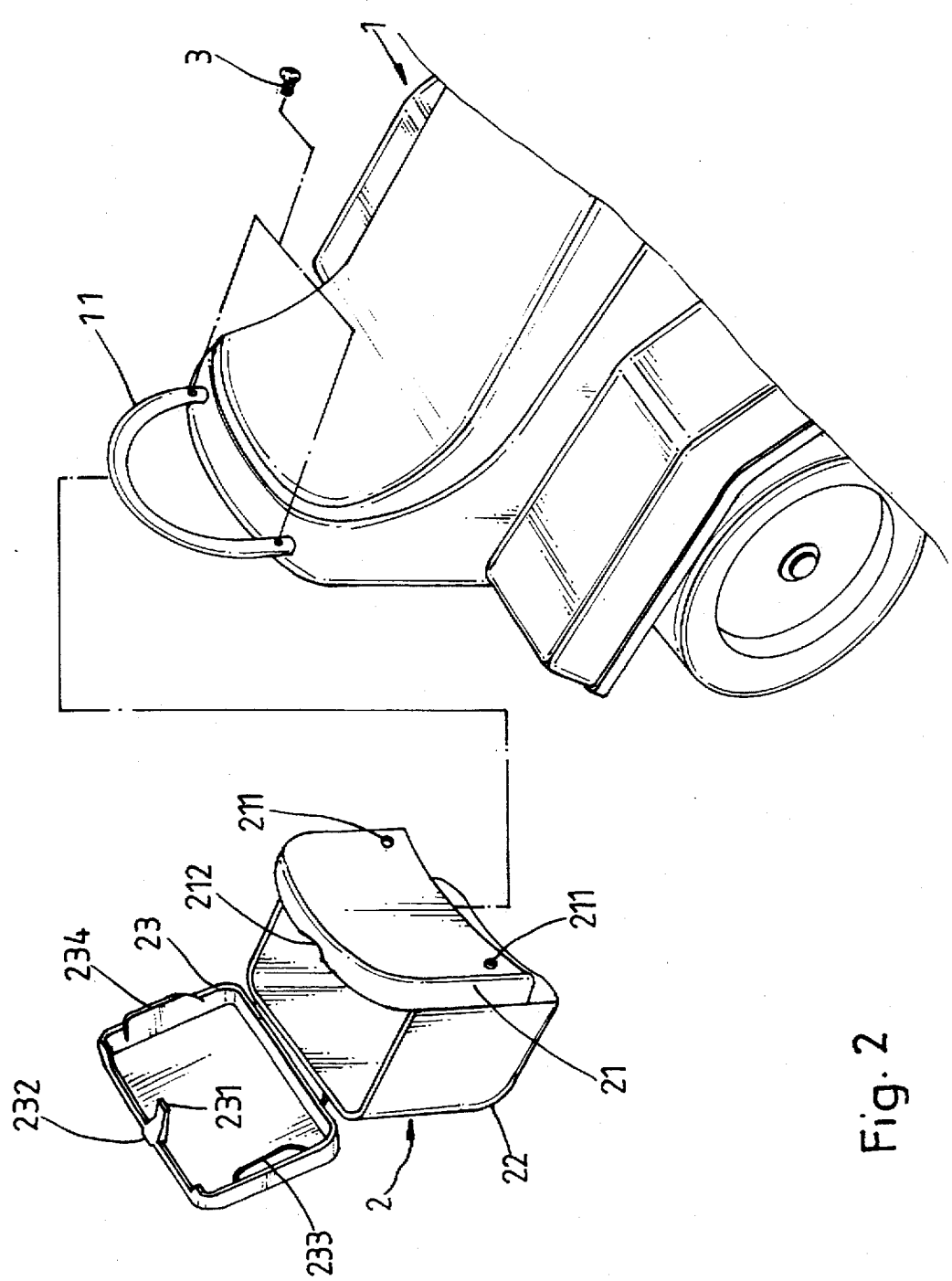
FIG. 2 is an exploded view of the present invention.
Figure 3:
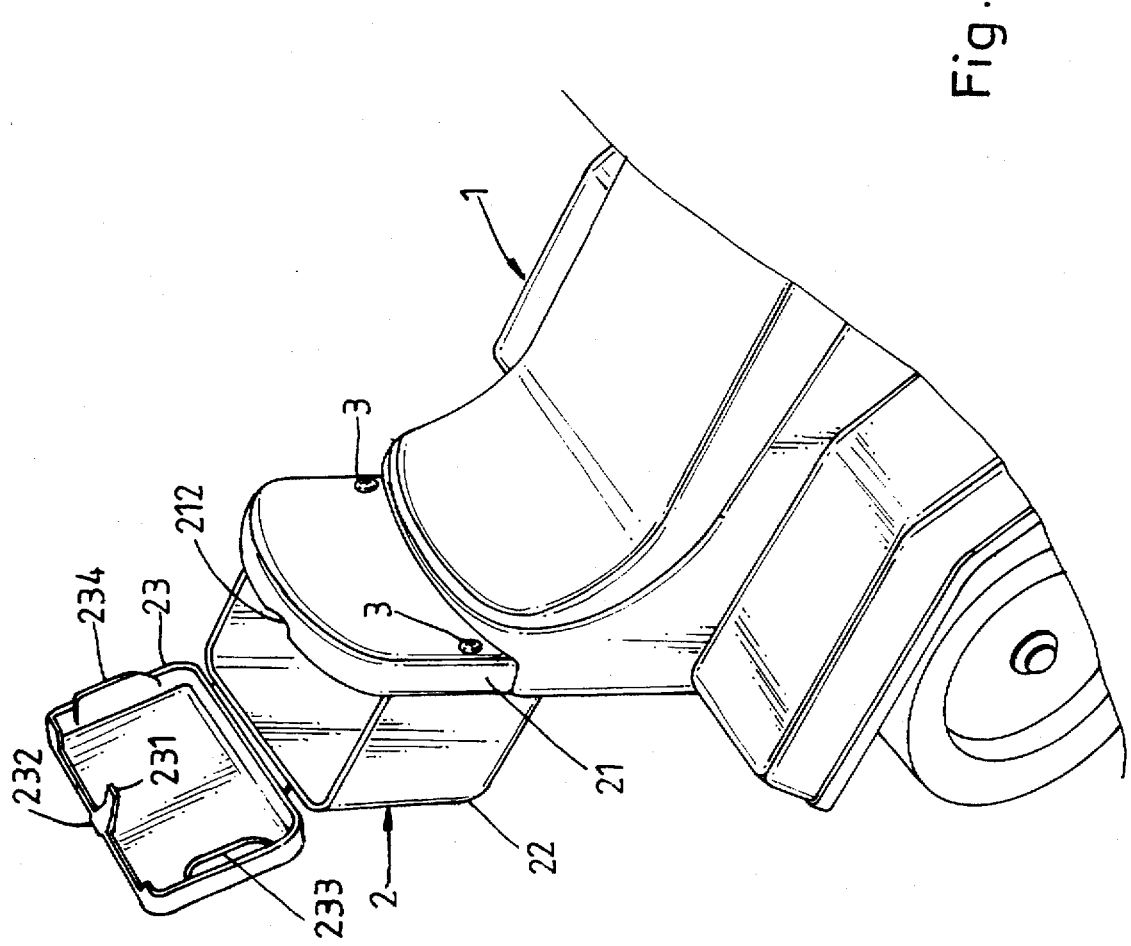
FIG. 3 is an elevational view of the present invention, showing the storage case fastened to the baby tricycle.
Figure 4:
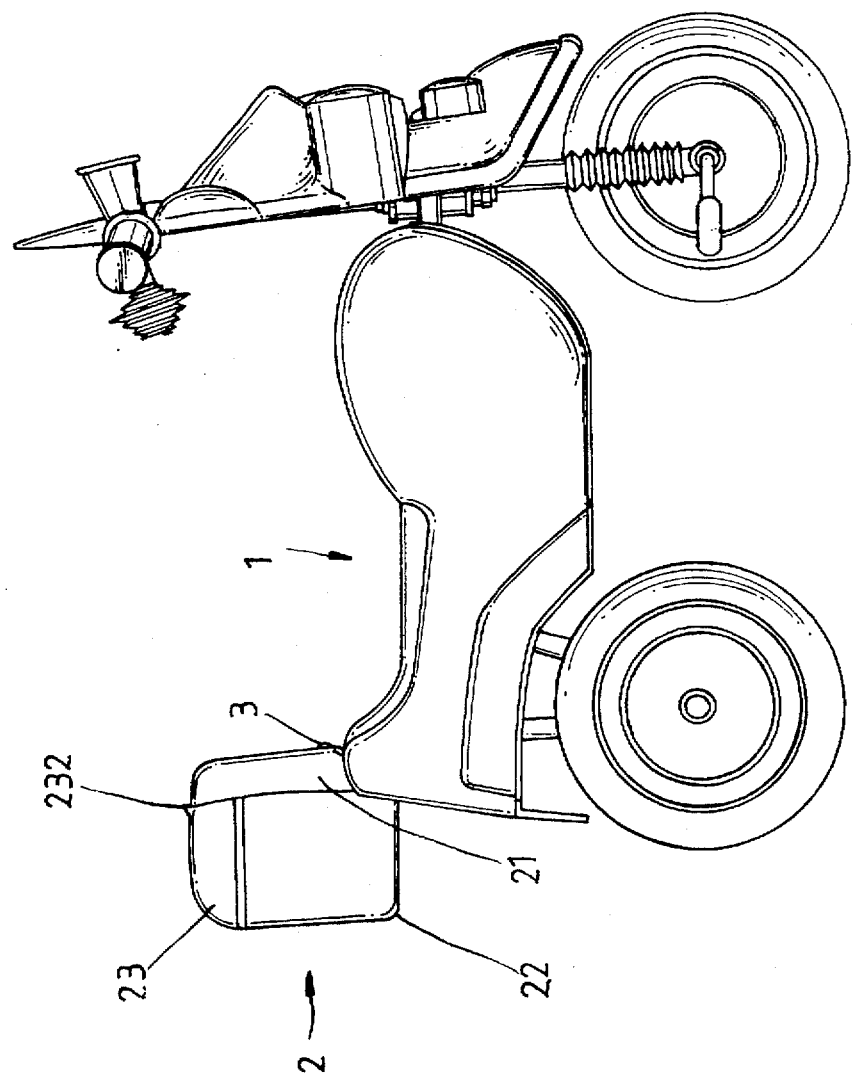
FIG. 4 is a side view of the present invention, showing the storage case fastened to the baby tricycle at the back side.
Figure 5:
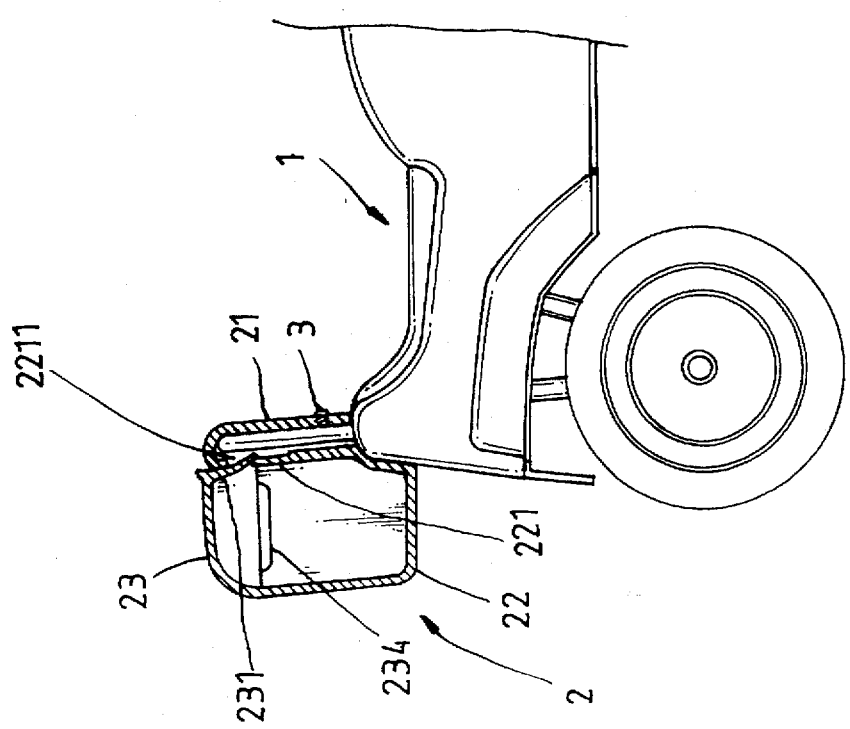
FIG. 5 is a sectional view of the present invention, showing the cover closed on the case body.

Referring to FIGS. from 2 to 5, a storage case 2 which is preferably injection-molded from plastic is fixedly fastened to an upright back frame 11 of a baby cart for example a baby tricycle 1, and served as a seat back for supporting the back of the child who rides the baby tricycle 1. The storage case 2 comprises a top-open case body 22, a hollow, bottom-open coupling block 21 integrally formed at one side namely the front side of the case body 22 and adapted to be sleeved onto the upright back frame 11 of the baby tricycle, and a cover 23 hinged to one side namely the back side of the case body 22. The coupling block 21 has two mounting holes. When the coupling block 21 is sleeved onto the upright back frame 11 of the baby tricycle 1, screws 3 are inserted into the mounting holes 211 and threaded into upright back frame 11 to fixedly secure the storage case 2 to the upright back frame 11 of the baby tricycle 1. The front side of the coupling block 21 is smoothly curved so that the child's back can be comfortably rested on the coupling block 21. The back side of the coupling block 21 has a finger recess 212 near the top. The cover 23 has a back side hinged to the case body 22 two springy downward flanges 233, 234 at its two opposite intern sides, a raised block 232 in the middle of its front side, and a springy retainer rod 231 extended from the raised block 232. The case body 22 has an upright locating wall 221 disposed on the inside adjacent to the coupling block 21 and made with a retaining hole 2211 (see FIG. 5). When the cover 23 is closed on the ease body 22, the downward flanges 233, 234 are respectively inserted into the case body 22 and forced into close contact with the inside wall of the case body 22, and the springy retainer rod 231 is forced into engagement with the retaining hole 2211 of the upright locating wall 221 of the case body 22, and therefore the cover 23 is retained in the closed position. By inserting a finger into the finger recess 212 to pull the raised block 232 upwardly backwards, the cover 23 is opened from the case body 22.

I claim:

1. A storage case mounting structure comprising an upright back frame raised from a rear side of a set of a baby cart, and a storage case fixedly fastened to said upright back frame to serve as a seat back, said storage case comprising a case body adapted for holding things and having a front side, a back side, two opposite lateral sides, a top opening, and an upright locating wall disposed on the inside behind said front side and defining a retaining hole, a hollow, bottom-open coupling block raised from the front side of said case body and sleeved onto said upright back frame of said baby cart and fixedly secured thereto by fastening means and having a back recess disposed above the front side of said case body, and a cover hinged to the back side of said case body and adapted to close said top opening, said cover comprising a back side hinged to the back side of said case body, to springy downward flanges extending from two opposite lateral sides thereof and adapted to be inserted into the top opening of said case body and forced into close contact with the to opposite lateral sides of said case body, a raised block raised from a front side thereof in the middle corresponding to the back recess of said coupling block, and a springy retainer rod extended from said raised block and adapted to be forced into engagement with the retaining hole of the upright locating wall of said case body when said cover is closed on said case body.

* * * * *